Oct. 7, 1924.

W. E. JORY 1,510,678

AUTOMOBILE HEADLIGHT

Filed Jan. 2, 1924

INVENTOR
W. E. JORY
BY
ATT'YS.

Patented Oct. 7, 1924.

1,510,678

UNITED STATES PATENT OFFICE.

WILLIAM E. JORY, OF MARTINEZ, CALIFORNIA.

AUTOMOBILE HEADLIGHT.

Application filed January 2, 1924. Serial No. 683,853.

*To all whom it may concern:*

Be it known that I, WILLIAM E. JORY, a citizen of the United States, residing at Martinez, in the county of Contra Costa and State of California, have invented new and useful Improvements in Automobile Headlights, of which the following is a specification.

This invention relates to an improved automobile head light which will effectively illuminate the road without causing "blinding" and glaring reflections to be directed so as to confuse or temporarily "blind" drivers of on-coming automobiles.

The primary object of the invention is to provide a head light glare shield, which shield automatically moves into shielding position when the automobile to which it is attached negotiates a hill, rise or grade, or encounters a bump or irregularity in the roadway whereby the "glaring or blinding" effect will be prevented under all conditions of operation of the automobile over a roadway.

Another object of the invention is to provide a simply constructed, inexpensive and reliable glare shield for automobile head lights.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 2:
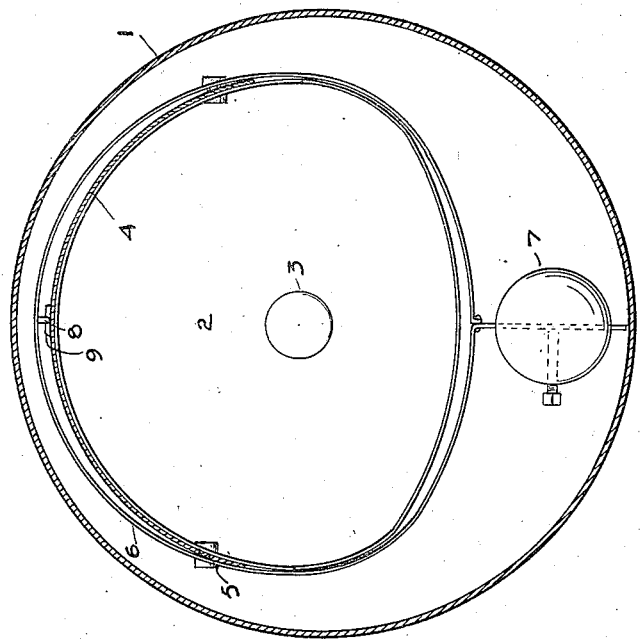
Fig. 2 is a front elevation of the head light of the invention.
Figure 1:
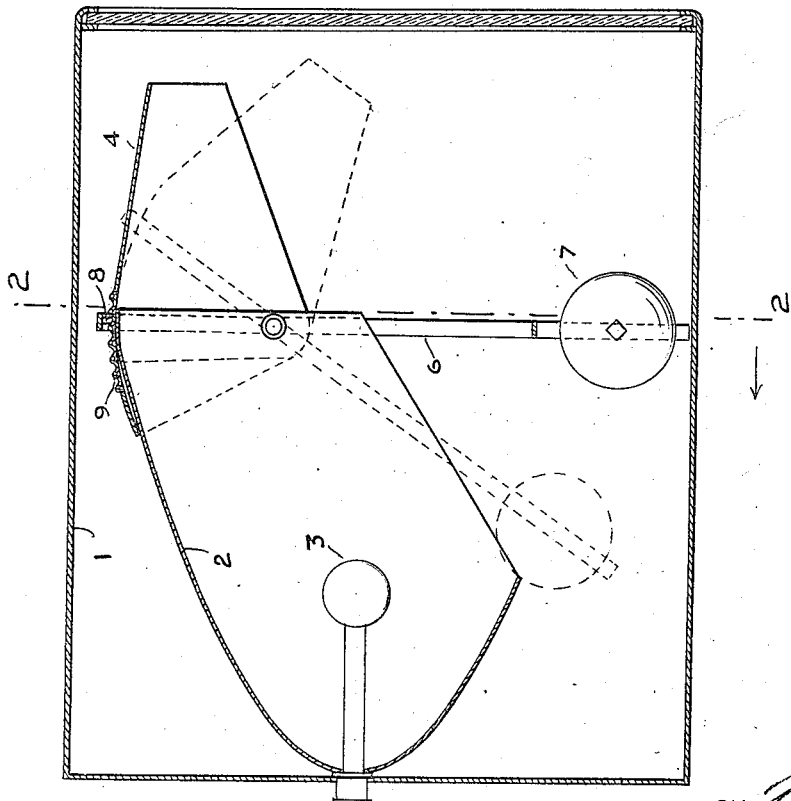
Fig. 1 represents a vertical sectional view of a head light constructed in accordance with the present invention showing the shield in different shielding positions assumed automatically, dependent on the movement of the automobile.

In carrying out the invention, a hood or shield is provided at the upper part of an automobile head light and mounted so that it will, when the automobile is operated on grades, rises, etc., as well as on level roadways, prevent the "blinding" and confusing of the drivers of approaching automobiles.

Ordinary stationary or fixed glare shields are ineffective when the automobile encounters a rise or grade in the roadway or a bump or other irregularity, such as would have a tendency to direct the rays upwardly out of the normal plane of projection. The shield of this invention is provided with a pendulum arrangement which automatically moves the shield into shielding position when the automobile encounters a hill, grade or irregularity in the roadway.

In the embodiment of the invention shown in the accompanying drawing, 1 designates a lamp casing, housing a parabolic resflector 2, and provided at the focal plane of the reflector with an electric light 3. On the upper part of the lamp is a hood or shield 4 which is arcuate in form and arranged to prevent upward and outward reflections from being directed so that drivers of on-coming vehicles will be confused or temporarily blinded. This hood is pivoted as at 5 on opposite sides of the reflector and acts as a continuation of the upper part of the reflector and it may have its inner surface treated to serve as a reflector. Extending from the upper side of the hood and downwardly, are arms 6 through which the pivot members 5 extend and on the lower ends of which a weight 7 is adjustably mounted. The arms are joined at their upper ends and where joined carry a projection 8 which is adapted to engage with a resilient notched keeper 9 fixed to the reflector. By adjusting the arms so that the projection engages in different notches, the position of the shield may be changed as desired. The weighted arms will swing rearwardly when the automobile rises on a grade, hill or projection and cause the shield to be tilted in a forwardly and downwardly inclined position so as to compensate for the change in position of the head lights, due to the front elevation of the automobile, thus causing the shield to automatically move into shielding position. The shield may be set to be disposed in different positions by adjustment of the arms 6 as previously described.

I claim:

1. The combination with an automobile head light, of a glare shield pivoted on the light and extending forwardly and downwardly therefrom to prevent glaring light rays from being directed upwardly and outwardly from the lamp, an upright arm pivoted intermediate of its ends on the light and having its upper end adjustably attached to the shield, and a weight attached to the lower end of the arm.

2. The combination with an automobile head light, of a glare shield pivoted on the light and extending forwardly and downwardly therefrom to prevent glaring light rays from being directed upwardly and outwardly from the lamp, an arm having a pivot intermediate of its ends and attached to the shield and extending downwardly therefrom, a weight attached to the lower end of the arm, said arm and shield being adjustable relative to one another and means for holding the arm and shield in adjusted position.

WILLIAM E. JORY.